United States Patent
Drescher

(10) Patent No.: US 8,391,269 B2
(45) Date of Patent: Mar. 5, 2013

(54) METHOD AND SYSTEM FOR TRANSMITTING DATA FROM A MEDIUM ACCESS CONTROL DEVICE VIA A PHYSICAL LAYER TO AN ANTENNA

(75) Inventor: Wolfram Drescher, Dresden (DE)

(73) Assignee: NXP B.V., Eindhoven (NL)

( * ) Notice: Subject to any disclaimer, the term of this patent is extended or adjusted under 35 U.S.C. 154(b) by 1144 days.

(21) Appl. No.: 12/097,041

(22) PCT Filed: Dec. 6, 2006

(86) PCT No.: PCT/IB2006/054620
§ 371 (c)(1),
(2), (4) Date: Jun. 11, 2008

(87) PCT Pub. No.: WO2007/069134
PCT Pub. Date: Jun. 21, 2007

(65) Prior Publication Data
US 2008/0279174 A1    Nov. 13, 2008

(30) Foreign Application Priority Data
Dec. 12, 2005    (EP) ..................................... 05111992

(51) Int. Cl.
*H04J 3/06* (2006.01)
(52) U.S. Cl. ......... 370/350; 370/463; 370/503; 375/293
(58) Field of Classification Search .................. None
See application file for complete search history.

(56) References Cited

U.S. PATENT DOCUMENTS

| | | | |
|---|---|---|---|
| 5,526,529 A * | 6/1996 | Tamano ........................ 455/103 |
| 6,072,769 A * | 6/2000 | Ho ................................ 370/204 |
| 6,198,722 B1 * | 3/2001 | Bunch ........................... 370/229 |
| 2003/0174048 A1 | 9/2003 | McCorkle |
| 2004/0151109 A1 | 8/2004 | Batra et al. |
| 2004/0190548 A1 * | 9/2004 | Harel et al. .................... 370/466 |
| 2004/0235499 A1 * | 11/2004 | Tanaka et al. ............... 455/456.5 |
| 2005/0068900 A1 | 3/2005 | Stephens et al. |
| 2006/0068732 A1 * | 3/2006 | Jin ............................. 455/232.1 |
| 2007/0206551 A1 * | 9/2007 | Moorti et al. ................. 370/338 |

FOREIGN PATENT DOCUMENTS

WO    2007/069134 A3    6/2007

OTHER PUBLICATIONS

ECMA International "MAC-PHY Interface for ECMA-368," Standard ECMA-369, 59 pgs. (Dec. 2005).
Wimedia Alliance "ECMA International Standards" (Jun. 2007) at www.wimedia.org/en/resources/eis.asp (retrieved from internet archive at www.archive.org).

* cited by examiner

Primary Examiner — Yemane Mesfin
Assistant Examiner — Khoa Huynh

(57) ABSTRACT

The invention relates to a system for transmitting data from a medium access control device (2) via a digital interface (IF1) to a physical layer (PHY) and to an antenna (5), the physical layer (PHY) comprising a base band (4) with a base band controller (7) and a data processing pipeline (3) comprising a plurality of functional blocks (FB1 to FB 13), wherein a burst timing control block of one of all functional blocks (FB1 to FB 13) of the data processing pipeline (3) detects an end of a packet of payload data and, thereupon, sets a halt signal (STALL) for those functional blocks (FB1 to FB 13) preceding the burst timing control block (FB1 to FB 13) in the data processing pipeline (3) and starts a timer (T1) for counting a duration of a minimum inter-frame space (MIFS), wherein the burst timing control block (FB1 to FB 13) resets the halt signal (STALL) after expiration of the timer (T1). It also relates to a corresponding method.

12 Claims, 2 Drawing Sheets

METHOD AND SYSTEM FOR TRANSMITTING DATA FROM A MEDIUM ACCESS CONTROL DEVICE VIA A PHYSICAL LAYER TO AN ANTENNA

The invention relates to a method and a system for transmitting data from a medium access control device via a digital interface to a physical layer and to an antenna, wherein the physical layer comprises a base band with a base band controller and a data processing pipeline comprising a plurality of functional blocks.

Transmitting systems having such features are used in particular in communications devices (also called UWB transmitter, with UWB=ultra-wide band): The transmitting systems are part of an transceiver, such as of an ultra-wide band transceiver which could be integrated in several electronic devices such as in pocket PCs, in mobile phones, in digital cameras, etc.

The technical specification for an digital interface (shortly called MAC-PHY interface) between a medium access control device (shortly called MAC) and a physical layer (shortly called PHY) requires a certain timing in the transmit path of the interface. There are two transmit operations—"Single Frame transmit" and the "Burst Mode transmit". The invention relates to "Burst Mode transmits".

In "Burst Mode transmits" there is an explicit relationship between each frame in a sequence of frames. A burst is defined as a transmitted sequence of frames which separated by a minimum inter-frame space (shortly called MIFS) during transmission. The medium access control device starts and controls the burst mode transmission by setting the transmitter into burst mode. All frames in the burst mode transmission use a standard preamble or a burst preamble. The first frame usually uses the standard preamble. The second and subsequent frames of the burst use the shorter burst preamble. Therefore, the receiver receives the frames in a predetermined timing scheme.

With respect to the transmission time management during the burst mode by the medium access control device, the transmission from the medium access control via the digital interface to the physical layer and to the antenna could be controlled in real-time only with high effort because of the very short minimum inter-frame space between the frames. Typically, the physical layer will be reset between consecutive frame transmissions. In case a physical layer reset was received from the medium access control device, which restarts the data processing pipeline, the effective restart applies not at the same cycle as it was received by the base band controller (shortly called BBC). This is due to an internal latency of the base band controller logic and a latency until the signal "Data_EN" is deasserted to the medium access control device (shortly called MAC).

Moreover, the pipeline of a base band logic circuit shows different latencies for distinguished data rates and operational modes. In such a case the overall latency of the base band logic is highly unpredictable and hence is not suited for accomplishing a distinct timing behaviour of the digital circuit.

It is an object of this invention to specify a method and a system for transmitting data from a medium access control device via a digital interface to a physical layer and to an antenna by which it is possible to overcome the difficulties of the burst transmission found in the prior art, i.e. to keep a consistent, exact timing during the transmission of burst frames.

The problem is solved by a method comprising the features given in claim 1 and by a system comprising the features given in claim 6.

Advantageous embodiments of the invention are given in the respective dependent claims.

According to the invention, an end of a packet of payload data is detected in the physical layer in one of all functional blocks of the data processing pipeline. Especially, the last functional block is used as a single burst timing control block. Thereupon, a halt signal for at least some of those functional blocks preceding the single burst timing control block in the data processing pipeline is asserted. The halt signal stalls the affected computing blocks while it freezes their current state. A timer for counting the duration of a minimum inter-frame space is started. After expiration of this timer, the halt signal is de-asserted. As only the preceding upstream functional blocks are frozen caused by the halt signal from the single functional block, the remaining previous functional blocks from the first functional block to the burst timing control block keep up their duty until their buffers run empty. After the time for a minimum inter-frame space has elapsed, the preceding functional blocks resume their duty. The invention thus enables a consistent, exact timing in burst mode transmission such that the data can be correctly transmitted.

In a preferred embodiment, said halt signal is detected using the base band controller and a data enable signal for the medium access control device is asserted or de-asserted depending on the halt signal. This enables the interface to freeze the data stream coming from the medium access control device without losing data due to a data enable signal occurring later than the freeze of the pipeline.

Preferably, a suffix insertion functional block at the end of the pipeline is used as the burst timing control block. Preferably, a functional block doing its calculations on time domain signal should be used. This way, the time offset between the single burst timing control block and the antenna is minimal. Thus, the timing can be as tight as needed for high accuracy of the minimum inter-frame spacing (also called MIFS spacing).

Advantageously, an internal timer of the single burst timing control block is used for counting the duration. This reduces time differences and potential delays in the timing control.

It is preferred to the halt signal in burst mode and in non-burst mode. In non-burst mode, halt may be used for stalling faster blocks if they are ahead in calculation compared to slower blocks.

The re-use of a halt signal in burst mode can be advantageously realised if the base band controller sends a burst mode signal to the burst timing control block if the system is in burst mode, wherein the burst timing control block sends the halt signal only if it detects the burst mode signal. This way, the base band controller itself can ignore the transmission mode. Concerning the disabling of the data enable signal, it just reacts to the halt signal.

FIG. 1 shows a general block diagram of an ultra-wide band transmitter 1 (further shortly called "transmitter 1").

Figure 1:
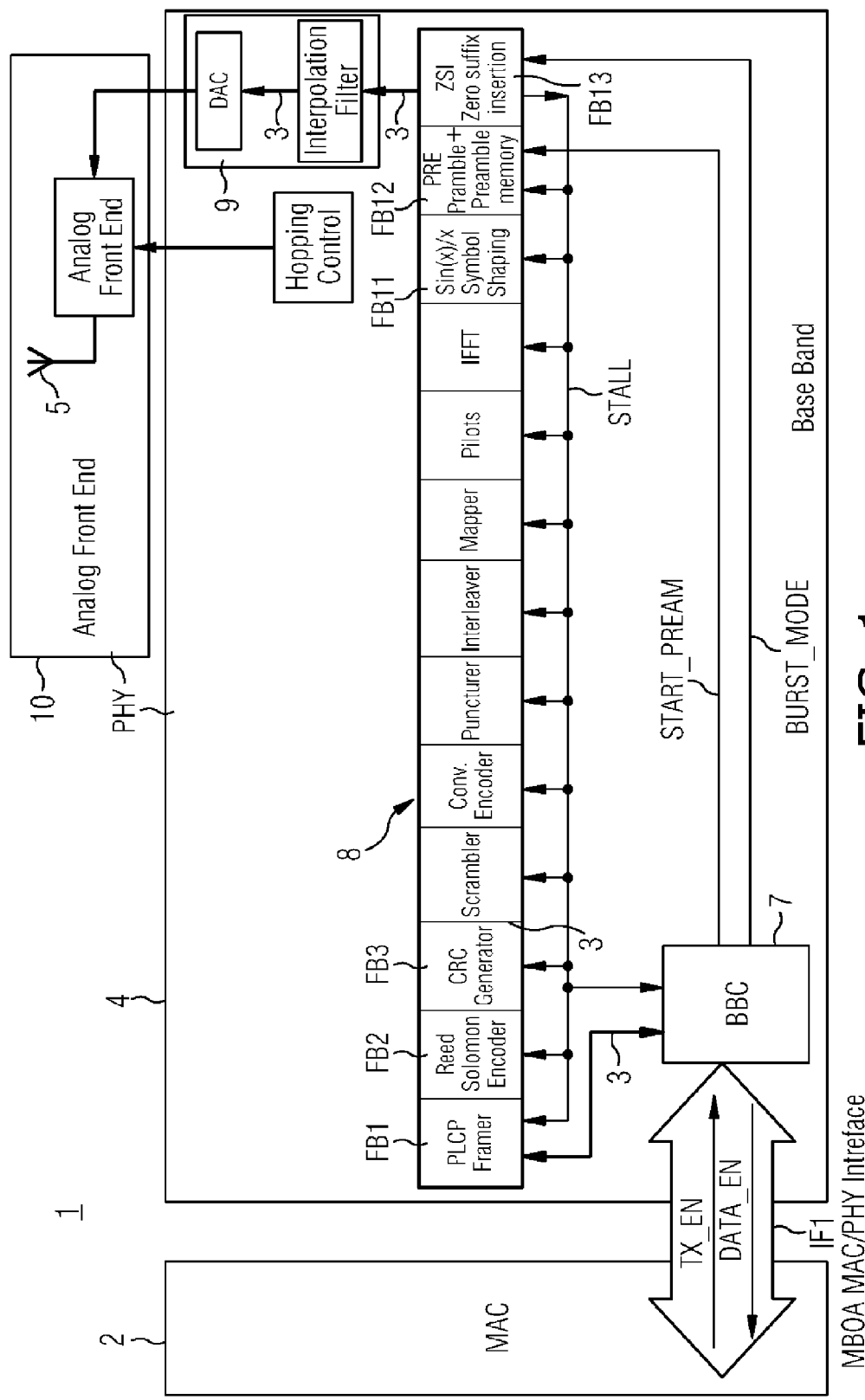
FIG. 1 shows a block schematic diagram of the architecture of a device with a medium access control device, coupled through a digital interface (also called MAC-PHY interface) to the base band and to an antenna. The device may operate as a communication device, e.g. as a UWB device.

The transmitter 1 or a transmitting system is used in particular in radio communication devices (also called UWB transmitter, with UWB=ultra-wide band): The transmitter 1 could be part of an transceiver, such as of an ultra-wide band transceiver which could be integrated in several electronic devices such as in pocket PCs, in mobile phones, in digital cameras, etc.

The transmitter 1 transfer data from a medium access control device 2 via a digital interface IF1 to a physical layer PHY and to an antenna 5, wherein the physical layer PHY comprises a base band 4 with a base band controller 7 and a data processing pipeline 3 comprising a plurality of functional blocks FB1 to FB13.

The technical specification for an serial interface IF between the medium access control device 2 and the physical layer PHY requires a certain timing in the transmit path of the serial management interface part of the digital interface IF1. There are two transmit operations—"Single Frame transmit" and the "Burst Mode transmit". The invention relates to "Burst Mode transmits".

In "Burst Mode transmit" there is an explicit timing relationship between each frame in a sequence of frames. A burst is defined as a transmitted sequence of data frames, which is separated by a minimum inter-frame space MIFS where no information is sent during transmission. The medium access control device 2 starts and controls the burst mode transmission by first setting the transmitter 1 in the burst mode. All frames in the burst transmission use a standard preamble or a burst preamble. Therefore, the receiver receives the frames in a predetermined time.

Basically, all functional blocks FB1 to FB13 processing data in the time domain or in frequency domain may be shifted from time domain into frequency domain and vice versa. For instance, the functional blocks FB1 to FB10 work in the frequency domain; the functional blocks FB11 to FB13 after the fast Fourier transformation functional block FB10 work in the time domain.

The data are in particular transmitted from the medium access control device 2 via the parallel interface part of the digital or so called MAC-PHY interface IF1 to the base band 4 and through the data processing pipeline 3 of the base band 4 comprising the plurality of functional blocks FB1 to FB13 to an antenna 5. When a packet is transmitted, it always starts with a transmission of a preamble to the antenna 5, which is created by a preamble functional block FB12 in the data processing pipeline 3.

As a general rule, in single frame transmission mode the timing control is performed in the base band controller 7 of the base band 4. The medium access control device 2 initiates a single frame transmission via the serial interface part of the digital interface IF1 by setting a command signal "TX_EN", which is denoted by TX_EN. Usually, the base band controller 7 is triggered by this event and starts transmission of the preamble immediately by utilising a start preamble signal "START_PREAM" which connects the base band controller 7 and the preamble block FB12.

The preamble of the preamble block FB12 is a fixed sequence stored in preamble memory 6 and hence does not have to be encoded by the other transmit path functional blocks FB1 to FB11 Thus, a transmit encoder 8 of the base band 4 which comprises the data processing pipeline 3 has enough time to fill its data processing pipeline 3 during preamble transmission until the encoded data signal reaches the preamble block FB12.

When the preamble transmission is completed, the encoded header and payload data has to be transmitted to the antenna 5 via a high-speed digital front-end 9 and a radio frequency subsystem 10 (shortly called analog front-end). Hence, the preamble functional block FB12 switches from reading the preamble memory 6 to reading the data coming from the functional blocks FB1 to FB11 preceding the preamble block FB12 in the data processing pipeline 3.

The invention relates to a burst mode transmission. The medium access control device 2 initiates a burst mode transmission via the serial interface IF1 by setting a burst mode signal "BM". A burst is a sequence of data frames, which transmitted from the same source, e.g. from the medium access control device 2, and separated by a minimum inter-frame space MIFS. However, in the burst transmission mode the timing of consecutively transmitted data frames is divided by the minimum inter-frame spaces MIFS, having the exact time duration of 6 OFDM symbols (=1,875 µs). The latency of the transmitter 1 is difficult to control in an exact manner due to different time domains of transmitted signals (radio frequency domain clock with 528 MHz), the digital clock of the transmit encoder with 66 MHz to 528 MHz and of the serial interface IF1 clock with 66 MHz.

A solution to solve this problem is that in burst transmission one all functional blocks FB1 to FB13, especially the last functional block FB13 (also called ZSI for Suffix insertion) of the data processing pipeline 3 will be responsible for the exact timing of the minimum inter-frame spaces MIFS. For this purpose, the present invention equips the last functional block FB13 with an internal timer T1 to control the burst time. The last functional block FB13 is used as a burst timing control block.

In the general solution, this timer T1 freezes all previous functional blocks FB1 to FB12 in the data processing pipeline 3 for the time of a minimum inter-frame space MIFS by sending a control signal "STALL" to one or more of the other relevant function blocks FB1 to FB12. If the minimum inter-frame space MIFS was inserted, the function block FB13 disables the signal "STALL" and the transmit encoder 8 continues to run its data processing pipeline 3.

Furthermore, the functional block FB13 distinguishes single frame transmission mode and burst transmission mode by a signal "BURST_MODE" generated by the base band controller 7. The base band controller 7 does not distinguish between single frame transmission mode and burst transmission mode. It just continues to start generating frames triggered by the signal "TX_EN" on the serial interface part of the digital interface IF1 between the medium access control device 2 and the base band 4.

In detail, the base band controller 7 comprises a connection for a burst mode signal "BURST_MODE" that can be sent from the base band controller 7 to the suffix insertion functional block FB13 which is the last functional block of the data processing pipeline 3.

Additionally, the transmitter 1 comprises connections for a halt signal "STALL" that can be sent from the suffix insertion functional block FB13 to the other functional blocks FB1 to FB12 of the data processing pipeline 3 and to the base band controller 7. The suffix insertion functional block FB13 is equipped with the internal timer T1 that counts down the duration of one minimum inter-frame space MIFS.

Using the burst mode signal "BURST_MODE", the suffix insertion functional block FB13 can distinguish between single frame transmission mode and burst frame transmission mode of the base band 4 as described above. During the burst mode transmission the suffix insertion functional block FB13 is responsible for the exact timing of the minimum inter-frame spaces MIFS. By sending the halt signal "STALL", the suffix insertion functional block FB13 can freeze all other functional blocks FB1 to FB12 preceding it in the data processing pipeline 3 to keep a consistent burst mode timing.

If the suffix insertion functional block FB13 detects a burst mode signal "BURST_MODE" and detects the end of a packet of payload data having been transmitted through the data processing pipeline 3, it starts the internal timer T1, sets the halt signal "STALL". Then it inserts a minimum inter-frame space MIFS by adding the appropriate minimum inter-frame space MIFS pattern to the data stream and subsequently the suffix into the data stream before the next frame's header and payload data. While the timer T1 is running, the halt signal "STALL" stays enabled.

The halt signal "STALL" freezes all functional blocks FB1 to FB12 preceding the suffix insertion functional block FB13 (also called burst timing control block) in the transmit path for the time of the minimum inter-frame space MIFS following the payload data and the subsequent suffix data "ZSI". The suffix insertion functional block FB13 de-asserts the halt signal from preamble generation block FB12 only in order to insert the burst preamble pattern. After all burst preamble pattern have past the last functional block FB 13, the last functional block FB13 also de-asserts the halt signal from all other functional blocks FB1 to FB11.

The base band controller 7 does also detect the halt signal "STALL". While it is set, the base band controller 7 de-asserts the data enable signal "DATA_EN" for the medium access control device 2. Hence, the data stream from the medium access control device 2 is stopped in this period of time simultaneously with the data processing pipeline 3. After the minimum inter-frame space MIFS and the suffix data "ZSI" have been appended to the data stream, the suffix insertion functional block FB13 disables the halt signal "STALL". Due to this, the transmit encoder 8, i.e. the data processing pipeline 3, continues to run. The base band controller 7 also detects the disabled halt signal "STALL" and sets the data enable signal "DATA_EN" again, so the medium access control device 2 does not resume its data stream until the data processing pipeline 3 is ready again.

Hence, the base band controller 7 does not distinguish between single frame transmission mode and burst frame transmission mode. It just continues to start generating frames triggered by the command signal "TX_EN" on the serial interface IF1 if a halt signal "STALL" from the suffix insertion functional block FB13 is not detected.

Figure 2:
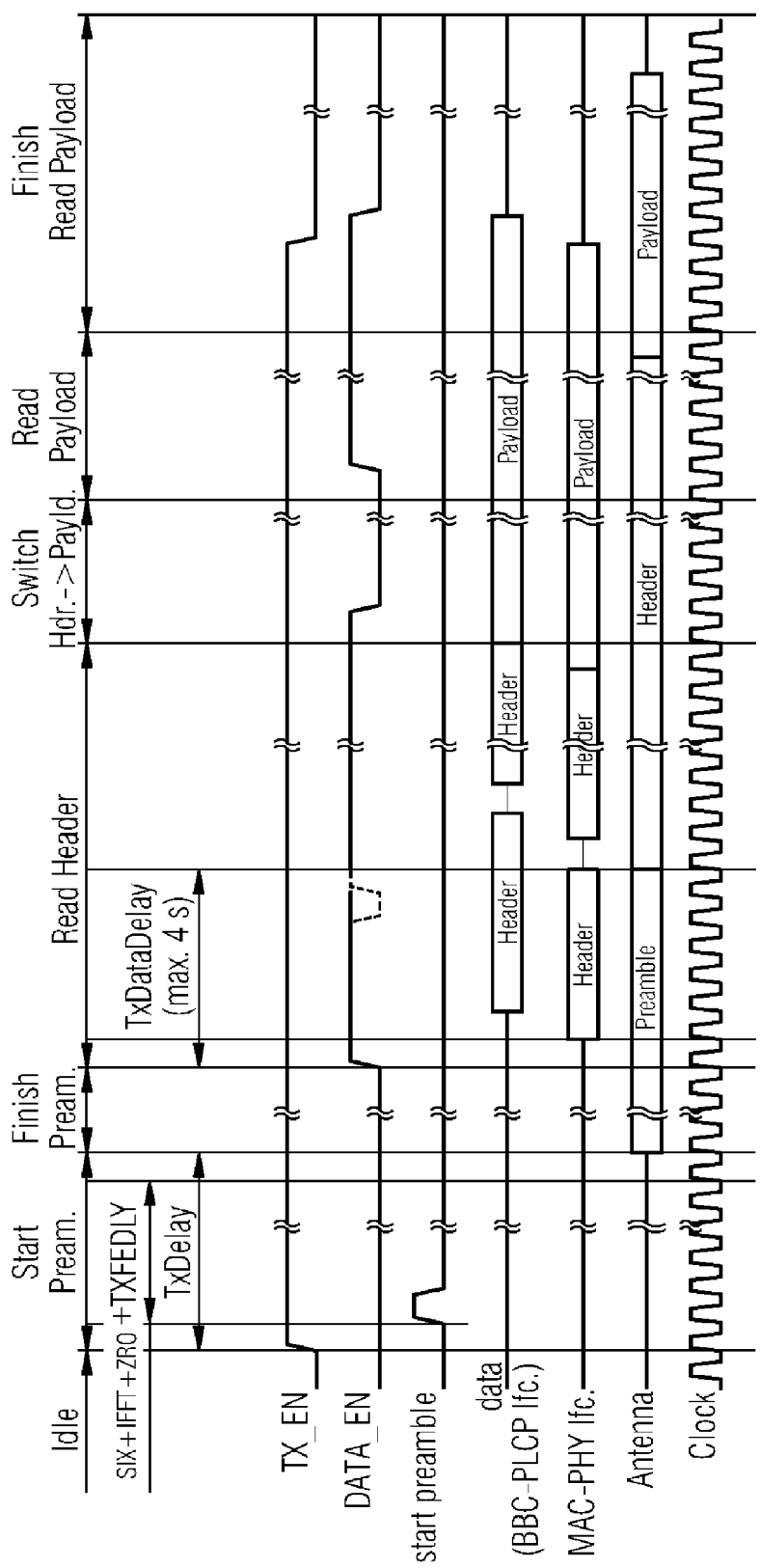
FIG. 2 shows the principle transmitter delay intervals for the transmit case including all signals involved in the data communication.

FIG. 2 shows the principle transmitter delay intervals for the transmit case including all signals involved in the data communication. Note that the signals are drawn from the perspective of the 66 MHz domain of the medium access control device 2. If signals of higher frequency domains are depicted, they are drawn aligned to the 66 MHz domain.

The transmit process is initiated by the medium access control device 2 asserting the command signal "TX_EN". An internal state machine of the base band controller 7 is then brought to transmit state. If this is done, the base band controller 7 indicates to the suffix insertion functional block FB13 to start generation and transmission of the preamble by asserting the signal "start_pream".

Normally, in non-burst mode the transmit system is controlled by the medium access control device 2 or rather by the base band controller 7.

In the time critical burst mode, the transmit system is controlled by the last functional block FB13, which is used as the burst timing control block, as described above. In both control methods the halt signal is used.

In non-burst mode, the halt signal is used for stalling faster functional blocks FB1 to FB13 if they are ahead in calculation compared to slower functional blocks. For the non-burst mode, the halt signal is reused for the burst timing control, wherein the burst timing control block sends the halt signal only if it detects the burst mode signal.

LIST OF NUMERALS

1 Transmitter
2 Medium access control device
3 Data processing pipeline
4 Base band
5 Antenna
6 Preamble memory
7 Base band controller
8 Transmit encoder
9 High speed digital front-end
10 Analog front-end
IF1 MAC-PHY interface including a serial management interface and a parallel data interface connecting medium access control device and base band
FB1 to FB11 Functional blocks
FB12 Preamble functional block
FB13 Suffix insertion functional block (with an integrated burst timing control block)
TX_EN Control signal "transmit enable"
DATA_EN Control signal "data enable"
START_PREAM Control signal "Start preamble signal"
STALL Control signal "halt"

The invention claimed is:

1. A method for transmitting data from a medium access control device of a transmitter via a physical layer of the transmitter to an antenna of the transmitter, wherein the physical layer comprises a base band with a base band controller and a data processing pipeline comprising a plurality of functional blocks, comprising the steps of:
   detecting an end of a packet of payload data in a single burst timing control block of the data processing pipeline of the base band;
   thereupon, from the single burst timing control block of the data processing pipeline of the base band, setting a halt signal for those functional blocks preceding the single burst timing control block in the data processing pipeline of the base band;
   starting a timer for counting a duration of a minimum inter-frame space;
   inserting the minimum inter-frame space into the data by adding an inter-frame space pattern to the data; and
   after expiration of the timer, resetting the halt signal;
   wherein the base band controller sends a burst mode signal to the single burst timing control block if the system is in burst mode and wherein the single burst timing control block sends the halt signal only if it detects the burst mode signal.

2. The method according to claim 1, wherein said halt signal is detected using the base band controller and a data enable signal for the medium access control device is asserted or de-asserted depending on the halt signal.

3. The method according to claim 1, wherein a suffix insertion functional block at the end of the data processing pipeline is used as the single burst timing control block.

4. The method according to claim 1, wherein an internal timer of the burst timing control block is used for counting the duration.

5. The method according to claim 1, wherein the halt signal is sent in burst mode only.

6. The method according to claim 1, wherein the halt signal is re-used in the burst mode for burst timing control.

7. A system for transmitting data from a medium access control device of a transmitter via a physical layer of the transmitter to an antenna of the transmitter, the physical layer comprising a base band with a base band controller and a data processing pipeline comprising a plurality of functional blocks, wherein a burst timing control block of one of the functional blocks of the data processing pipeline of the base band detects an end of a packet of payload data and, thereupon, sets a halt signal for those functional blocks preceding the burst timing control block in the data processing pipeline of the base band and starts a timer for counting a duration of a minimum inter-frame space, wherein the minimum inter-frame space is inserted into the data by adding an inter-frame space pattern to the data, and wherein the burst timing control block resets the halt signal after expiration of the timer, wherein the base band controller sends a burst mode signal to the burst timing control block if the system is in burst mode and wherein the burst timing control block sends the halt signal only if it detects the burst mode signal.

8. The system according to claim 7, wherein the base band controller detects the halt signal and, thereupon, sets or resets a data enable signal to the medium access control device depending on the halt signal.

9. The system according to claim 7, wherein the burst timing control block is a suffix insertion functional block at the end of the data processing pipeline.

10. The system according to claim 7, wherein the timer is integrated into the burst timing control block.

11. The method according to claim 1, wherein the setting the halt signal causes those functional blocks in the data processing pipeline of the base band to freeze their current state and wherein resetting the halt signal causes those functional blocks in the data processing pipeline of the base band to resume their duty.

12. The system according to claim 7, wherein the burst timing control block sets the halt signal to cause those functional blocks in the data processing pipeline of the base band to freeze their current state and resets the halt signal to cause those functional blocks in the data processing pipeline of the base band to resume their duty.

* * * * *